Jan. 5, 1965 P. J. READ 3,164,679

BI-DIRECTIONAL AMPLIFYING SYSTEMS

Original Filed May 15, 1961 2 Sheets-Sheet 1 inventor:

P. J. Read

Robert B. Harmon

ATTORNEY

Jan. 5, 1965 P. J. READ 3,164,679

BI-DIRECTIONAL AMPLIFYING SYSTEMS

Original Filed May 15, 1961 2 Sheets-Sheet 2 inventor:

P. J. Read

Robert B. Harmon

ATTORNEY 3,164,679

BI-DIRECTIONAL AMPLIFYING SYSTEMS

Phillip J. Read, Ottawa, Ontario, Canada, assignor to Northern Electric Company, Limited, Montreal, Quebec, Canada, a corporation of Canada

Continuation of application Ser. No. 109,905, May 15, 1961. This application June 15, 1964, Ser. No. 376,295
18 Claims. (Cl. 179—16)

This invention relates to telephone systems and more particularly to transistor bi-directional amplifying circuits employed therewith. This application is a continuation of my original application, Serial No. 109,905, filed May 15, 1961, now abandoned.

In long-line telephone circuits, it is necessary to amplify the ringing signals transmitted from the central office and to reshape the dialling pulses generated by a subscriber. In such circuits, it has been the general practice to carry out these functions at a point between the central office and the subscriber's station. This arrangement heretofore involved the use of mechanical elements which, due to their large size and the necessity of mechanical adjustment, have generally not been too successful.

An object of this invention is to provide a telephone system which includes a bi-directional amplifier transistor circuit adapted to transmit dialling pulses from the subscriber's station to the central office and ringing signals in the opposite direction.

Another object of the invention is to provide a telephone system having the foregoing properties adapted to allow increase of the loop resistance whilst maintaining the same loop current.

These and other objects of this invention are attained by providing within an automatic telephone system which includes the combination of a dial pulse input circuit and a ringing current output circuit, and the combination of a ringing current input circuit and a dial pulse output circuit, amplifying means comprising a first amplifier means, controlled by the subscriber's loop circuit, and a second amplifier means, controlled by the ringing energy from the central office, and a diode bridge connected into the circuit so as to steer, in one direction through the circuit, the supervising current from the central office.

Figure 1:
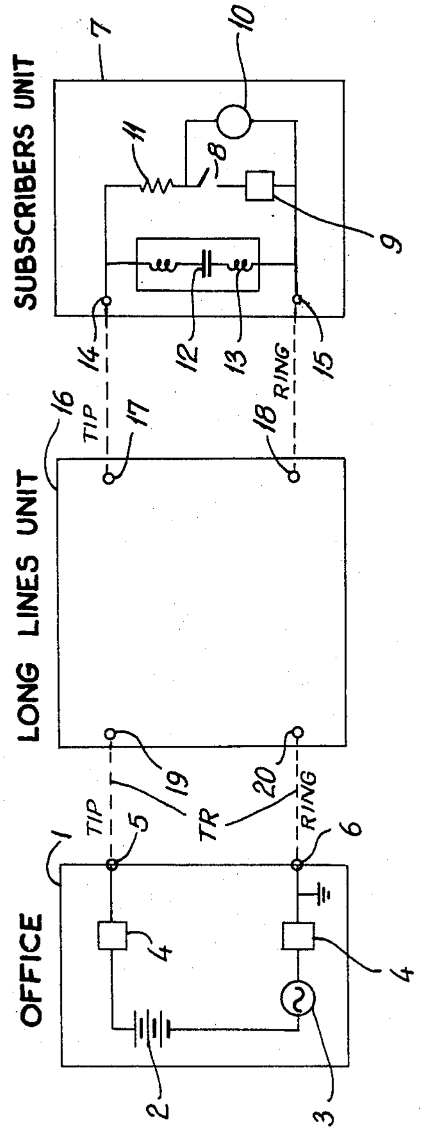
Figure 2:
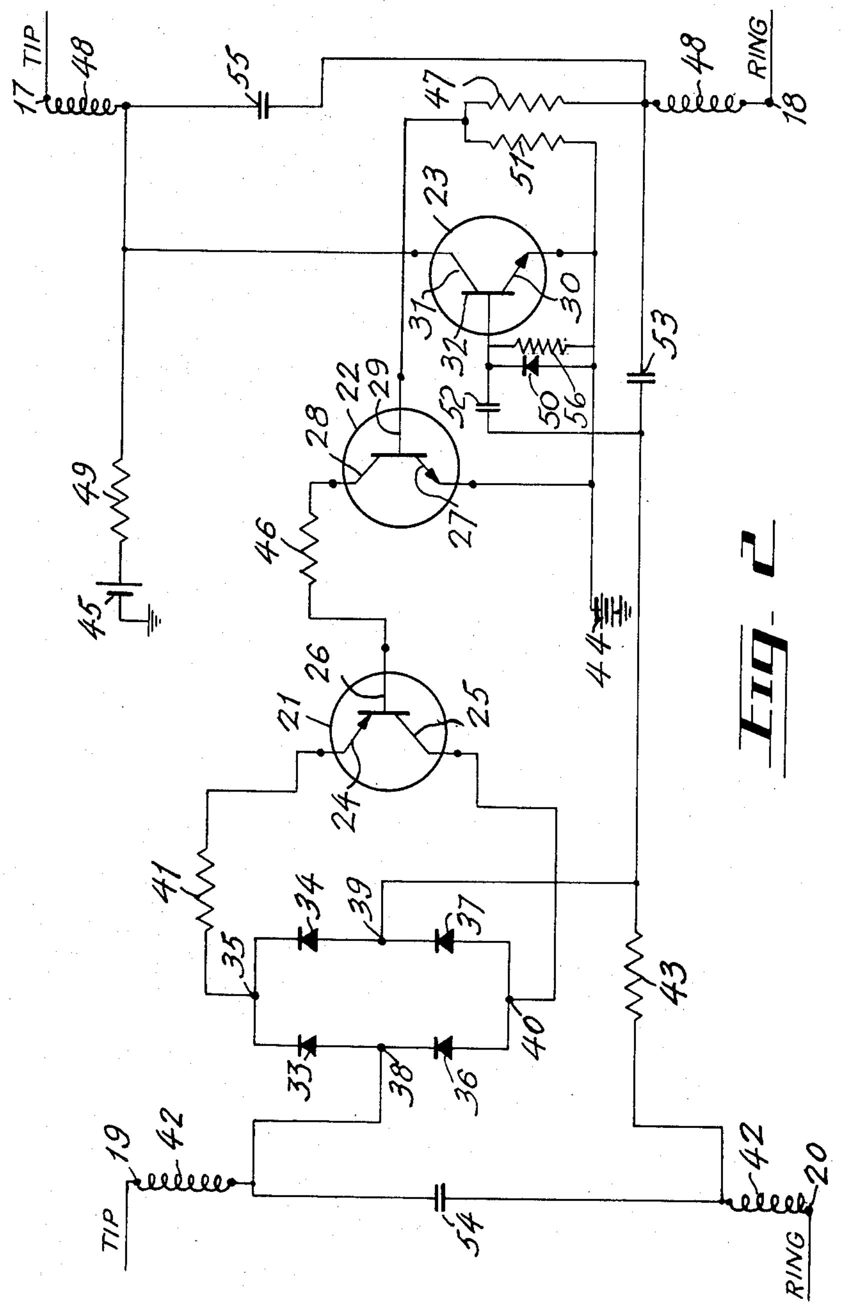

A better understanding may be had by referring to the following description, taken in conjunction with the drawings in which like references refer to like parts, in which:

FIG. 1 illustrates a telephone system in block form showing only the essential elements to define the invention and including an intermediate station, in which the invention is represented; and FIG. 2 illustrates a schematic circuit of the intermediate station.

Considering the drawings, there is shown a central office 1, having a reversible potential source 2, which may be 48 volts, a ringing source 3, which may be up to of the order of 100 volts R.M.S., selector switches 4, terminals 5, 6. Also shown is subscriber's station 7, having switchhook 8, receiver 9, impulse dial 10, resistor 11, capacitor 12, ringer 13, terminals 14, 15. Interposed between the central office 1 and substation 7 is an intermediate station 16 having terminals 17, 18 and 19, 20.

In this example, central office 1 has selector switches 4 which may be operated by dial pulses, and a source of ringing current 3 which may be transmitted to subscriber's unit 7. Therefore, conductors terminating at terminals 5 and 19, and 6 and 20 respectively, comprise the first and second dial pulse input circuit and ringing current output circuit conductors. Conductors terminating at terminals 7 and 14, and 18 and 15 respectively, comprise the first and second ringing input current circuit and dial pulse output circuit conductors.

In FIG. 2 there is shown a complementary pair of transistors consisting of first and second transistors 22, and 21 and a third transistor 23 each having emitter, collector and base electrodes 27, 28, 29 and 24, 25, 26 and 30, 31, 32 respectively.

Also shown is transformer windings 42 and 48 and a bridge circuit, connected thereto consisting of a first and second semi-conductor diode 33, 34 having their cathodes connected together to form a first junction point 35, a third and fourth semi-conductor diode 36, 37 individually connected in series and in the same polarity with the first and second diode 33, 34 to form a second and third junction point 38, 39. The free ends of the diodes 36, 37 are connected together to form a fourth junction point 40.

The first and fourth junction points 35, 40 are connected to the emitter 24 through optional resistor 41, and to collector 25 of transistor 21 respectively, while the second and third junction points 38, 39 are connected to the tip and ring side of the central office conductors, first and second conductors of the dial pulse output circuit, through the transformer winding 42 and through optional resistor 43 and other transformer winding 42. Resistors 41 and 43 may be inserted in the circuit to increase the dial pulse output circuit resistance.

Also shown are first and second direct current sources 44, 45 connected with opposite poles to ground. The emitter 27, collector 28 and base electrodes 29 of transistor 22 are connected to the first energy source 44, to the base electrode 26, of transistor 21 through protection resistor 46, and to one conductor of the subscriber's loop, the dial pulse input circuit, through resistor 47 and coupling winding 48 respectively. The other conductor of the subscriber's loop is connected to the second energy source 45, through resistor 49 annd transformer coupling winding 48.

Considering the third transistor 23, the emitter 30, collector 31 and base electrode 32 are connected to the first energy source 44, resistor 49 and the third junction point 39 respectively. A limiting diode 50 is connected between the emitter 30 and base 32 of transistor 23. Resistor 51 is connected between the emitter and base electrode 30 and 29 of transistors 23 and 22 respectively.

Also shown is a potential dividing circuit consisting of the coupling capacitor 52 connected between the base electrode of transistor 23 and junction point 39, resistor 43 and capacitor 53 connected between the junction point 39 and the coupling coil winding 48. Capacitors 54, 55 are audio by-passing capacitors.

A transformer having primary winding 42 and secondary winding 48 may be used to transfer signals other than dial pulses or ringing current (voice signals, for instance) across my amplifying means. One embodiment of this provides a transformer having a split primary winding and split secondary winding. Each coil of the primary winding 42 is connected in series with a conductor of the ringing current input circuit, and each coil of the secondary winding 48 is connected in series with a conductor of the dial pulse input circuit. Bypass capacitors 54 and 55 are connected between each conductor of the ringing input circuit and each conductor of the dial pulse input circuit respectively. Thus, it may be seen that voice signals can be transferred from primary to secondary winding or from secondary to primary winding, bypassing the amplifying means.

*On Hook*

In the idle condition, the potential at the base electrode 29 of transistor 22 is held close to the potential of the energy source 44 by the action of resistor 51. Consequently the emitter-base junction 27–29 in transistor 22 is reversely biased so that no current will flow through the collector-emitter 28–27 of transistor 22. As no current flows from the base 26 of transistor 21, no current can flow from the emitter 24 to the collector 25 of transistor 21. Thus only leakage current may pass from the energy source 2 in the central office 1, through the diodes 33, 37, the diodes 34, 36 being reversed biased and therefore non-conducting.

*Off Hook*

When the subscriber at substation 7 lifts his switchhook, the loop circuit 45–49–48–17–14–11–8–9–15–18–48–47–51–44 is closed. The current flowing in this circuit causes the potential at the base 29 of transistor 22 to rise so that the base-emitter junction 29–27 is forward biased allowing current to flow through resistor 46 and the collector 28, and emitter 27 of transistor 22. Thus, current is allowed to flow through the emitter 24 to the collector 25 of transistor 21. Since one or the other conductor of the dial pulse input circuit is effectively connected to ground at the central office, current can flow from ground through the diode bridge circuit, through emitter 24, base 26, resistor 46, collector 28 of transistor 22, emitter 27 and through current source 44 to ground. An energized circuit is now completed over the path 4–5–19–42–38–33–35–41–24–25–40–37–39–43–42–20–6–4–3–2. The current through this circuit operates the selector switches 4. As the subscriber operates his dial 10, the above loop opens and closes, setting the selector switches 4 at the central office 1. When the called party at the central office 1 responds to the call, the polarity at energy source 2 is reversed so that diodes 34, 36 conduct and diodes 33, 37 do not conduct.

*Ringing*

In signalling the subscriber at the subscriber's station 7, the signalling energy is transmitted over the line ringing current input circuit, from generator 3 through 5, 19, 6 and 20 to the intermediate office 16. Part of the signalling energy is applied to the capacitor 52 and to the base 32 of transistor 23 where the voltage excursion is limited by the action of diode 50. Of course, diode 50 can be left out and transistor 23 be driven to saturation and off for limiting action. Another part of the ringing energy is coupled to the subscriber's ring lead by capacitor 53.

In order that the potential generated by the generator 3 does not exceed the reachthrough potential of transistor 23, the resistance of resistor 43 and the parallel impedance of capacitors 52 and 53 are arranged to form a potential divider which reduces the alternating potential at the cathode of diode 50 by the required amount. Resistor 46 protects transistors 21 and 22 against collector-emitter reachthrough potentials.

Due to the high current gain (about 50) of transistor 23, ringing current which drives the transistor off and into saturation results in a limited signal developed across the load resistor 49. The voltage applied to the ringing current output circuit at terminal 17 is caused to swing between that supplied by source 44 and source 45. This resulting alternating current is transmitted along the subscriber's tip lead 17–14 and causes the bell in the ringer 13 to sound. The values of resistors 49, 47 and 51 are arranged in this example so that satisfactory operation of the unit may be obtained when the subscriber's loop resistance is not greater than 3000 ohms and the leakage resistance on this loop is greater than 30,000 ohms.

It would appear that this ringing current could operate the dial pulse amplifier means comprising transistors 21 and 22 due to alternating ringing voltage developed across resistors 47 and 51. However, capacitor 53 by-passes some of the ringing current around transistor 23 to develop an alternating ringing voltage across these resistors effectively 180 degrees out of phase with that fed back from the ringing current output circuit. This phase reversal occurs because transistor 23 causes a 180 degree phase change during amplification of the ringing current. Thus, the two ringing current components effectively cancel each other such that transistors 21 and 22 do not conduct effectively from ringing current alone. However, if direct current is allowed to flow in the dial pulse input circuit due to, say, a subscriber answering his telephone, closing the subscriber's loop, the direct potential appearing across voltage divider resistors 47 and 51 will cause transistors 21 and 28 to conduct, allowing current to flow through transistor 21 from the dial pulse output circuit. This current may, for instance, be used to operate external means to shut off the ringing current generator 3.

What is claimed is:

1. In an automatic switching telephone system, which includes a central office which includes a direct current source of reversible polarity, a ringing current source, selection switches, a subscriber's station, and a transmission line comprising a tip and ring lead, an intermediate circuit for relaying supervisory signals over the transmission line comprising:

a first and second transistor which are a complementary pair, a solid bridge rectifying bridge circuit consisting of a first and second semi-conductor diode, an electrode of one being connected to a like electrode of the other to form a first junction point, a third and fourth semi-conductor diode connected in series with and in the same sense with the first and second diode respectively to form a second and third junction point respectively, the remaining unconnected electrodes being connected together to form a fourth junction point, a means for connecting the first and fourth junction point to the emitter and collector electrodes of the first transistor respectively, a first coupling means for connecting the second and third junction points to the tip and ring leads extending to the central office, respectively, means included in the coupling means to by-pass audio frequencies, a first and second energy source opposite in polarity, a means for connecting the collector and emitter electrodes of the second transistor to the base electrode of the first transistor and to the first source respectively, a second coupling means for connecting the subscriber's station ring lead to the base electrode, through a first load resistor, of the second transistor, the junction point of such electrode and resistor forming a fifth junction point which is connected to the first energy source,, and to the third junction point and for connecting the tip lead, through a second resistor, to the second energy source, means included in the second coupling means to by-pass audio frequency.

2. An automatic switching telephone system in accordance with claim 1 comprising in combination: a third transistor of like conductivity to the second transistor, in which the emitter is connected to the first source and the collector through the said second load resistor to the second source; a third coupling means for connecting the base of the third transistor to the third junction point; a fifth resistor connected to the base-emitter electrodes of the third transistor.

3. An automatic switching telephone system in accordance with claim 1 having means to amplify the ringing signals comprising in combination: a third transistor of like conductivity to the second transistor, in which the emitter is connected to the first source and the collector through the said second load resistor to the second source; a third coupling means for connecting the base of the third transistor to the third junction point; a fifth diode of like material to the third transistor connected in parallel relation and oppositely poled to the base-emitter electrodes of the third transistor.

4. An automatic switching telephone system in accordance with claim 3, in which the said ringing signals include a direct current component: a means for initiating ringing tripping which comprises a third resistor connected between the fifth junction point and the first energy source and a coupling capacitor connected between the said third junction point and the ring lead of the second coupling means.

5. In a circuit in accordance with claim 4: means to prevent the reachthrough potentials of the said first and second transistors from being exceeded, comprising in combination a potential divider consisting of a fourth resistor included in the said first coupling means for connecting the said third junction point to the central office and the parallel combination of said third coupling means, which includes a capacitor connected between the base electrode of the second transistor and the third junction point, together with the said coupling capacitor connected between the said third junction point and the subscriber's station ring lead.

6. In an automatic switching telephone system which includes the combination of a dial pulse input circuit and a ringing current output circuit, and the combination of a ringing current input circuit and a dial pulse output circuit, amplifying means for dial pulses and ringing current comprising:

(*a*) a source of direct current connected to the dial pulse input circuit, (*b*) first amplifier means having an input circuit and an output circuit, operative to amplify dialing pulses, and to allow current to flow and stop current from flowing in the dial pulse output circuit when current is flowing and not flowing respectively in the dial pulse input circuit, and (*c*) second amplifier means having an input circuit and an output circuit operative when ringing current is conducted through the ringing current input circuit to cooperate with said source of direct current and apply amplified ringing current to the ringing current output circuit.

7. Amplifying means as defined in claim 6 comprising means to effectively cancel ringing current which may be amplified by the first amplifier means.

8. Amplifying means as defined in claim 7 wherein a proportion of ringing current effectively 180 degrees out of phase with the ringing current to be amplified by said second amplifier means, is fed to the input circuit of said first amplifier means so as to cancel enough ringing current which may be flowing therein to prevent the first amplifier means from allowing significant direct current flow in the dial pulse output circuit.

9. Amplifying means for dialing pulses and ringing current as defined in claim 6, comprising means to cause unidirectional current to flow in the output circuit of the first amplifier means when current flowing in the dial pulse output circuit flows in a forward or reverse direction.

10. Amplifying means as defined in claim 9 wherein said means to cause unidirectional current to flow in the output circuit of the first amplifier means is a diode bridge circuit interposed between the output circuit of the first amplifier means and the dial pulse output circuit.

11. In a combination with amplifying means as defined in claim 6, bypass means to allow signals other than dial pulses and ringing current to bypass the amplifying means.

12. The combination including amplifying means as defined in claim 11 wherein said bypass means comprises a transformer having a primary and secondary winding, and two capacitors; the primary winding being connected in series with one capacitor across the dial pulse input circuit, and the secondary winding being connected in series with the second capacitor across the ringing current input circuit.

13. In an automatic switching telephone system which includes the combination of a dial pulse input circuit and ringing current output circuit having a first and second conductor, and a ringing current input circuit and a dial pulse output circuit having a third and fourth conductor, first amplifying means for dial pulses comprising:

(*a*) a first amplifier means comprising first and second transistors which are a complementary pair, having means connecting the collector of the first transistor to the base of the second transistor, (*b*) a bridge rectifier having input and output conductors, connected with its input conductors to the conductors of the dial pulse output circuit, and its output conductors to the collector and emitter respectively of the second transistor to form a first amplifier means output circuit, a first current source connected between ground and the emitter of the first transistor, a first and second resistor in series connected between the first conductor of the dial pulse input circuit and the emitter of the first transistor, the junction point of the two resistors being connected to the base of the first transistor;

(*c*) a second direct current source connected in series with a third resistor between the second conductor of the dial pulse input circuit and ground; the second current source being poled in such direction that it will be series aiding with the first direct current source as viewed from the first and second conductor of the dial pulse input circuit.

14. In an amplifying means as defined in claim 13, where the means connecting the collector of the first transistor to the base of the second transistor is a third resistor adapted to cause reduction of potential appearing between electrodes of the first and second transistors to a value less than that encountered at breakdown thereof.

15. In an automatic switching telephone system comprising first amplifying means as defined in claim 13, second amplifier means for ringing current comprising a third transistor of like polarity to the first transistor, with its collector connected to the junction of the third resistor and the second conductor of the ringing current output circuit, its emitter electrode connected to the emitter electrode of the first transistor, a first capacitor connected between one conductor of the ringing current input circuit and the base electrode of the third transistor, and a fourth resistor connected between the base and emitter electrodes of the third transistor.

16. Amplifying means as defined in claim 15 wherein a diode is connected in parallel with the fourth resistor, poled oppositely to the diode formed by the base-emitter junction of the third transistor.

17. Amplifying means as defined in claim 15 wherein a second capacitor is connected between the junction of the first capacitor and one conductor of the ringing current input signal, and the conductor of the ringing current output circuit which is connected to the first resistor.

18. Amplifying means as defined in claim 17 comprising a transformer having a split primary winding and a split secondary winding, each coil of the secondary winding being connected in series with one conductor of the dial pulse input circuit respectively and each coil of the primary winding being connected in series with one conductor of the ringing current input circuit respectively, and a third and fourth capacitor, the third capacitor being connected across the dial pulse input circuit and the fourth capacitor being connected across the dial pulse output circuit.

No references cited.

ROBERT H. ROSE, *Primary Examiner.*